(12) United States Patent
Hsu

(10) Patent No.: US 8,643,502 B2
(45) Date of Patent: Feb. 4, 2014

(54) CONNECTOR CAPABLE OF SHOWING CHARGING STATUS

(76) Inventor: Jui-Feng Hsu, New Taipei (TW)

( * ) Notice: Subject to any disclaimer, the term of this patent is extended or adjusted under 35 U.S.C. 154(b) by 308 days.

(21) Appl. No.: 13/246,878

(22) Filed: Sep. 28, 2011

(65) Prior Publication Data

US 2013/0076521 A1    Mar. 28, 2013

(51) Int. Cl.
*G08B 21/00*    (2006.01)

(52) U.S. Cl.
USPC .......................................................... 340/664

(58) Field of Classification Search
USPC ..................... 340/664, 636.2, 636.1, 636.13; 320/107, 114
See application file for complete search history.

(56) References Cited

U.S. PATENT DOCUMENTS

| | | | |
|---|---|---|---|
| 5,508,600 A * | 4/1996 | Myslinski et al. | 340/636.1 |
| 2009/0096417 A1* | 4/2009 | Idzik et al. | 320/115 |
| 2009/0160400 A1* | 6/2009 | Woud | 320/115 |
| 2009/0163247 A1* | 6/2009 | Song | 455/566 |
| 2012/0249054 A1* | 10/2012 | King et al. | 320/107 |

* cited by examiner

*Primary Examiner* — Phung Nguyen
(74) *Attorney, Agent, or Firm* — Leong C. Lei

(57) ABSTRACT

The present invention is a novel connector capable of showing charging status without turning on the device under charge. The connector contains a casing, a connection element, and a status indication member. The connection element is configured at a lateral side of the casing for connecting a device to be charged. The status indication member contains a current measurement unit, a first indication element, and a second indication element. The current measurement unit is electrically connected to the connection element and a cable. The first and second indication elements are electrically connected to the current measurement unit and exposed out of a front side of the casing. By the indication elements' lighting pattern, the user can determine how much full the device under charge is.

2 Claims, 5 Drawing Sheets

CONNECTOR CAPABLE OF SHOWING CHARGING STATUS

(a) TECHNICAL FIELD OF THE INVENTION

The present invention is generally related to connectors, and more particular to a connector having indicators showing the amount of current flowing through.

(b) DESCRIPTION OF THE PRIOR ART

Portable devices such as mobile phones, MP3 players, tablet computers, and handheld game consoles are widely popular these days. These devices all have built-in rechargeable batteries so that they can be operated without being confined to a wall outlet.

When these devices are charged, a user can only tell how much they are charged by their displays or some lamps on the devices, which is quite inconvenient. Especially these devices are often equipped with a touch screen for easier operation which consumes more electricity than other interface mechanisms, turning on these devices just to see the charging status is not economical, let alone the touching and pressing required.

Some charging devices have a power indicator on their plugs to signal that they are properly connected to a power source and there is indeed electricity present. However, the user has to specifically find the plug and check the indicator, again quite inconveniently. Most important of all, the user cannot tell how much a device has been charged simply by looking at the plug of a charging device.

SUMMARY OF THE INVENTION

Therefore, a novel connector capable of showing charging status is provided herein. With the connector, a user can immediately tell how much full a device under charge is without turning on the device and causing additional electricity consumption. The present invention can be applied to various connectors designed for different devices.

To achieve the above objective, the connector contains a casing, a connection element, and a status indication member. The connection element is configured at a lateral side of the casing for connecting a device to be charged. The status indication member contains a current measurement unit, a first indication element, and a second indication element. The current measurement unit is electrically connected to the connection element and a cable. The first and second indication elements are electrically connected to the current measurement unit and exposed out of a front side of the casing. A charging current is fed to the device to be charged via the cable and the connection element. In the meantime, the current measurement unit drives the first indication element to light. When the current measurement unit detects that the charging current flowing from the cable to the connection element is below a saturation threshold, the current measurement unit drives the second indication element to light or change color. After a fixed interval, the first and second indication elements are turned off.

Alternatively, the current measure unit drives the first and second indication elements to blink when the charging current is present. Then, when the charging current is below the saturation threshold, the current measure unit changes the frequency of blink of the first and second indication elements or turns them off.

As such, by simply looking at the first indicator element 32, a user can determine if the device to be charged is correctly connected and charged. As the stored electricity of an internal battery of the device to be charged increases, the charging current will gradually decrease. If the charging current is below the saturation threshold, the status of the first and second indication elements 32 and 33 is altered to signal that charging is completed. The user does not need to turn on the device under charge to see this, greatly enhancing convenience.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
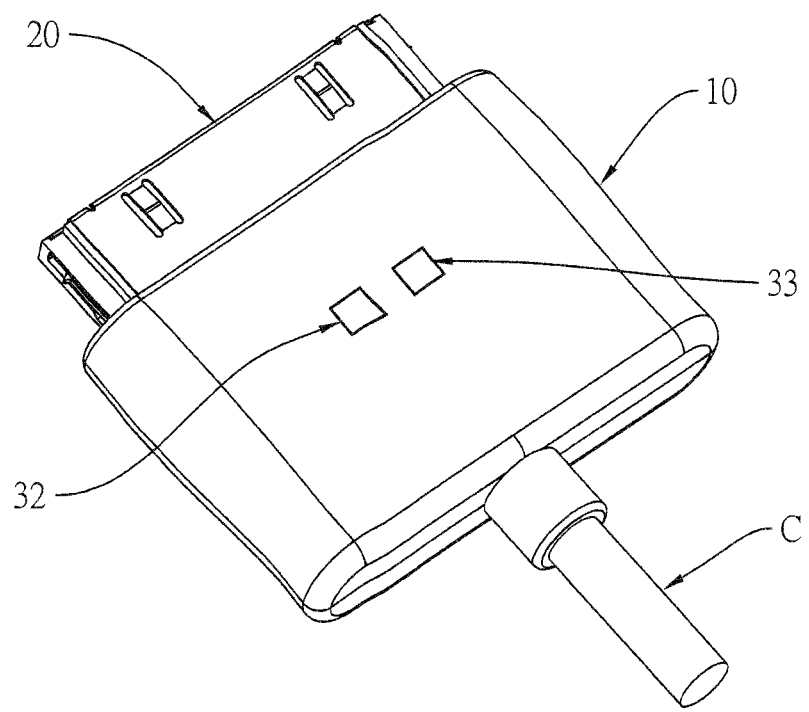
FIG. 1 is a perspective diagram showing a connector according to an embodiment of the present invention.
Figure 2:
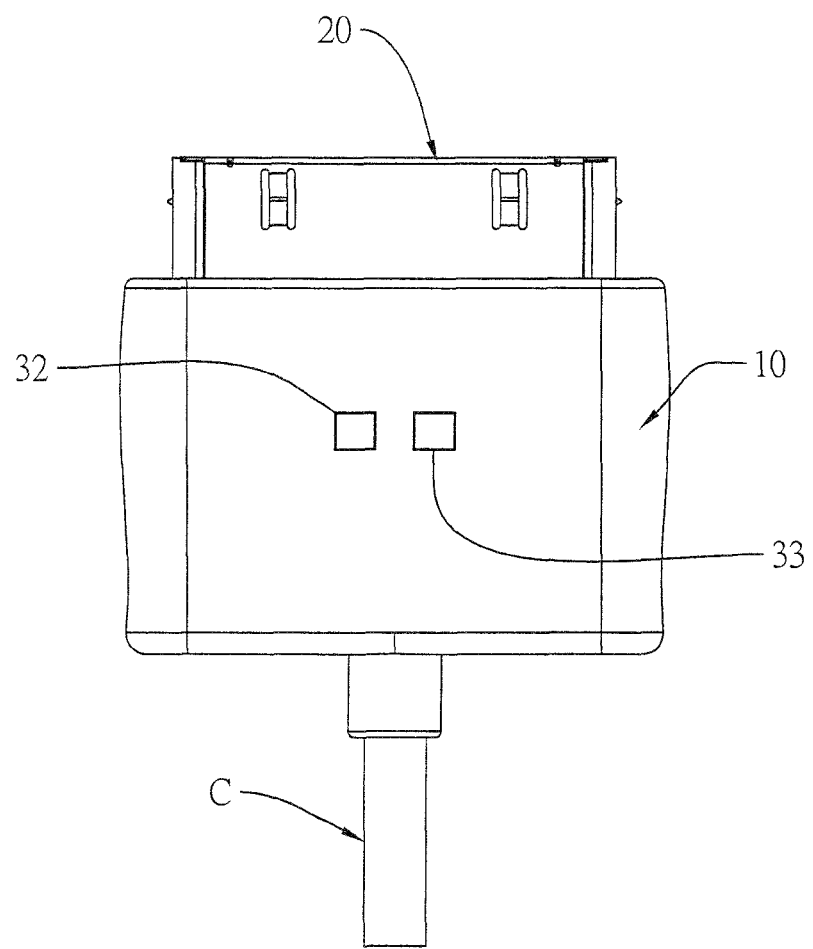
FIG. 2 is a front-view diagram showing the connector of FIG. 1.
Figure 3:
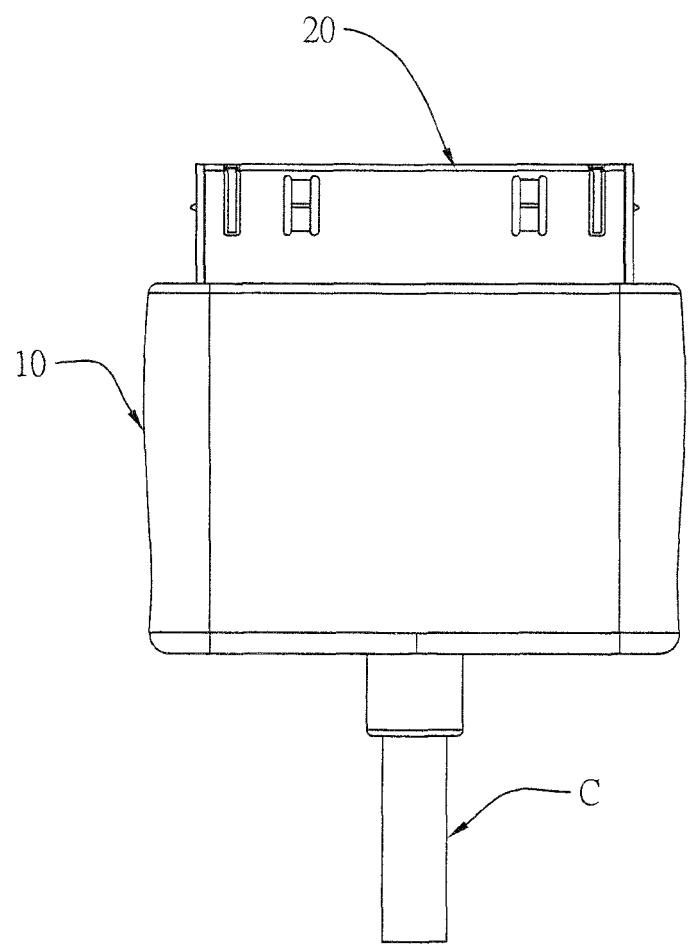
FIG. 3 is a rear-view diagram showing the connector of FIG. 1.
Figure 4:
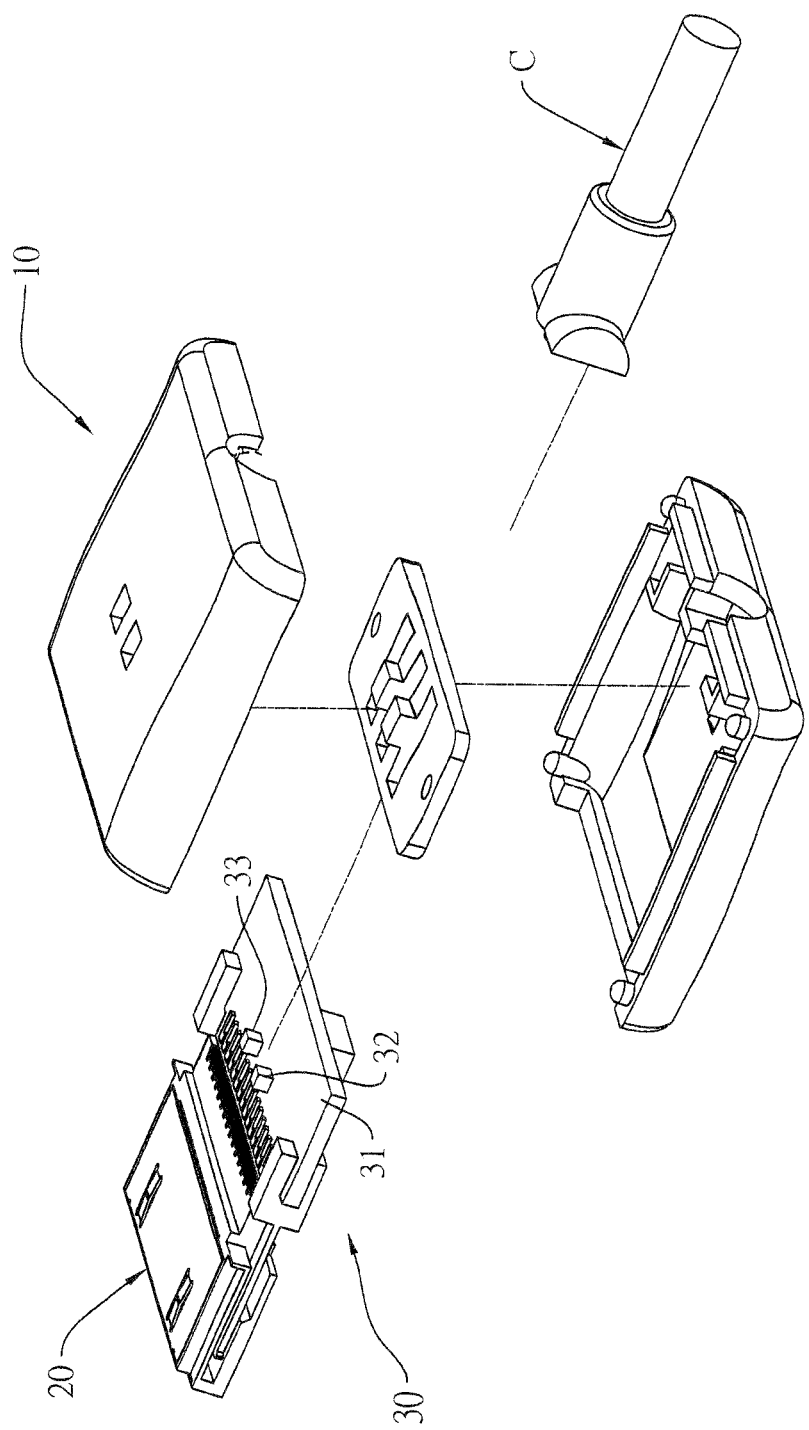
FIG. 4 is a perspective break-down diagram showing the various components of the connector of FIG. 1.

FIG. 1 is a perspective diagram showing a connector according to an embodiment of the present invention. FIGS. 2 and 3 are front-view and rear-view diagrams of the connector. FIG. 4 is a perspective break-down diagram showing the various components of the connector.

As illustrated in FIGS. 1 to 4, the connector contains a casing 10, a connection element 20, and a status indication member 30.

The connection element 20 is configured at a lateral side of the casing 10 for connecting a device (not shown) to be charged.

The status indication member 30 contains a current measurement unit 31, a first indication element 32, and a second indication element 33. The current measurement unit 31 is electrically connected to the connection element 20 and a cable C. The first and second indication elements 32 and 33 are electrically connected to the current measurement unit 31 and exposed out of a front side of the casing 10.

A charging current is fed to the device to be charged via the cable C and the connection element 20. In the meantime, the current measurement unit 31 drives the first indication element 32 to blink. When the current measurement unit 31 detects that the charging current flowing from cable C to the connection element 20 is below a saturation threshold, the current measurement unit 31 drives the first and second indication elements 32 and 33 to blink at a different frequency, or turns them off.

As such, by simply looking at the first indicator element 32, a user can determine if the device to be charged is correctly connected and charged. As the stored electricity of an internal battery of the device to be charged increases, the charging current will gradually decrease. If the charging current is below the saturation threshold, the status of the first and second indication elements 32 and 33 is altered to signal that charging is completed. The user does not need to turn on the device under charge to see this, greatly enhancing convenience.

Figure 5:
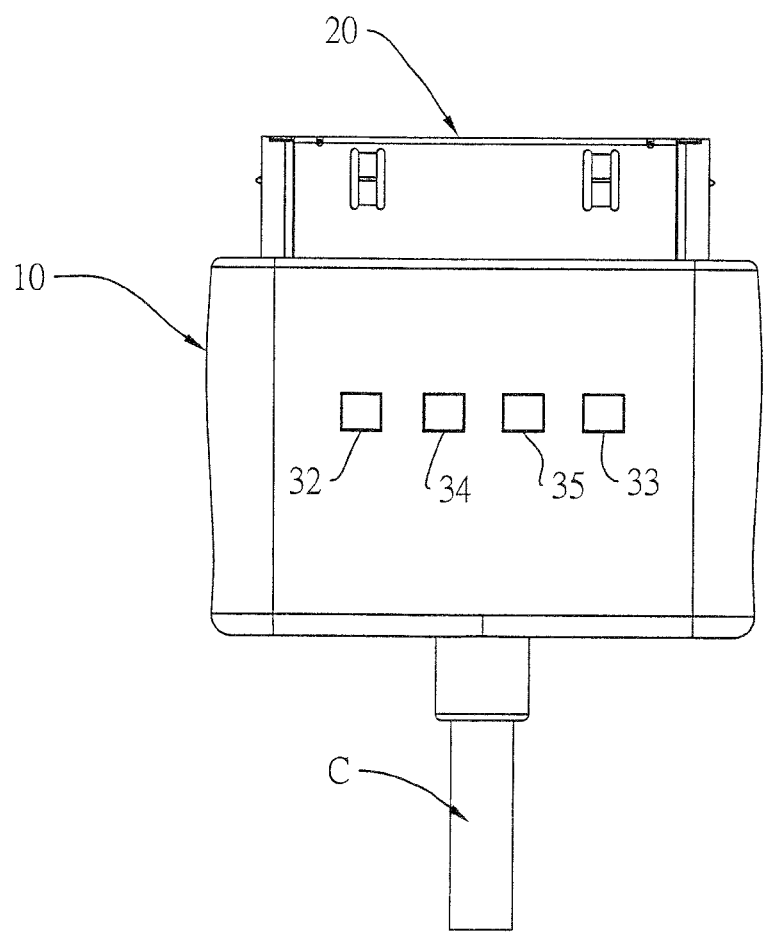
FIG. 5 is a front-view diagram showing a connector according to another embodiment of the present invention.

As shown in FIG. 5, the connector further contains a third indication element 34 and a fourth indication element 35. They are also electrically connected to the current measurement unit 31 and exposed out of the front side of the casing 10. If the charging current is below a first threshold, the current measurement unit 31 turns on or off, or changes the color of the third indication element 34. If the charging current is further below a second threshold, the current measurement unit 31 turns on or off, or changes the color of the fourth indication element 35. The first threshold is greater than the second threshold, which in turn is greater than the saturation threshold. Since the integration of the third and fourth indication elements 34 and 35 to the current measurement unit 31 should be well known to people of related arts and the details are omitted here.

As such, with the third and fourth indication elements 34 and 25, the user can visually determine the charging status of the device under charge, further enhancing the convenience.

Alternatively, the color of the first indication element 32 could be different from those of the second, third, and fourth indication elements 33, 34, and 35. Therefore, by these different colors, the user can determine the charging status without counting how many of the indication elements are turned on or off.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A connector, comprising:
   a casing;
   a connection element configured at a lateral side of said casing and connected to a device to be charged; and
   a status indication member comprising a current measurement unit electrically connected to said connection element and a cable, and a first indication element and a second indication element, both electrically connected to said current measurement unit and exposed out of a front side of said casing;
   wherein said current measurement unit drives said first indication element to light while a charging current flows through said cable and said connection element into said device to be charged; said current measure unit drives said second indication element to light when said charging current is below a saturation threshold; and said current measurement unit turns off said first and second indication elements after a fixed interval.

2. A connector, comprising:
   a casing;
   a connection element configured at a lateral side of said casing and connected to a device to be charged; and
   a status indication member comprising a current measurement unit electrically connected to said connection element and a cable, and a first indication element and a second indication element, both electrically connected to said current measurement unit and exposed out of a front side of said casing;
   wherein said current measurement unit drives said first and second indication elements to blink while a charging current flows through said cable and said connection element into said device to be charged; and said current measure unit drives said first and second indication elements to blink at a different frequency or to be off when said charging current is below a saturation threshold.

* * * * *